(12) United States Patent
Orndorff, Jr.

(10) Patent No.: US 6,224,809 B1
(45) Date of Patent: May 1, 2001

(54) METHOD OF MAKING A FENDER PROTECTIVE STRUCTURE

(75) Inventor: Roy Lee Orndorff, Jr., Kent, OH (US)

(73) Assignee: Duramax Marine, LLC, Middlefield, OH (US)

( * ) Notice: Subject to any disclaimer, the term of this patent is extended or adjusted under 35 U.S.C. 154(b) by 0 days.

(21) Appl. No.: 09/295,918

(22) Filed: Apr. 21, 1999

Related U.S. Application Data (63) Continuation-in-part of application No. 08/574,667, filed on Dec. 19, 1995, now abandoned.

(51) Int. Cl.⁷ .................................................. B29C 39/12
(52) U.S. Cl. ..................... 264/255; 264/313; 264/319; 264/331.15
(58) Field of Search ..................................... 264/313, 109, 264/112, 113, 122, 319, 271.1, 275, 255, 331.15; 475/DIG. 44

(56) References Cited

U.S. PATENT DOCUMENTS

| | | |
|---|---|---|
| 1,666,232 | 4/1928 | Boynton . |
| 2,039,488 | 5/1936 | McDonald . |
| 3,975,491 | 8/1976 | Kramer . |
| 4,596,734 | 6/1986 | Kramer . |
| 4,679,517 | 7/1987 | Kramer . |
| 4,735,982 | 4/1988 | Orndorff, Jr. . |
| 4,923,550 | 5/1990 | Kramer . |
| 5,095,840 | 3/1992 | Kramer . |

FOREIGN PATENT DOCUMENTS

| | | |
|---|---|---|
| 28 40 306 | 9/1978 | (DE) . |
| 0 414 110 A2 | 8/1990 | (EP) . |
| 1478162 | 4/1967 | (FR) . |
| 533 99 22 | 12/1993 | (JP) . |
| WO 91/17320 | 11/1991 | (WO) . |

Primary Examiner—Jan H. Silbaugh
Assistant Examiner—Edmund H. Lee
(74) Attorney, Agent, or Firm—D. Peter Hochberg; Katherine R. Vieyra; William H. Holt (57) ABSTRACT

A method of making a fender protective structure having a layer of resilient plastic/elastomer alloy having a delayed elastic response, comprising providing a mold, placing elastomer spacers in the mold, adding the plastic and elastomer to the mold under heat and pressure, and opening the mold and removing the spacers to create voids the alloy.

25 Claims, 9 Drawing Sheets

METHOD OF MAKING A FENDER PROTECTIVE STRUCTURE

This application is a continuation-in-part of application Ser. No. 08/574,667 filed on Dec. 19, 1995, now abandoned.

TECHNICAL FIELD

This invention relates to an impact pad for absorbing forces, and more particularly to a method of making an impact pad for absorbing forces having improved energy absorbent materials.

BACKGROUND OF THE INVENTION

In the operation of docking a ship, because of the speed of approach, swells, currents and winds it is imperative to provide a protective docking system to reduce potential damage and impact to the ship, dock or pier. In the case of holding ships, such impact pads are used to protect both the holding ship and the smaller vessel transported therein.

Examples of fender protective structures for these types of applications can be found in commonly owned U.S. Pat. Nos. 4,923,550, 4,596,734, 4,679,517 all of which are issued to Kramer and are hereby fully incorporated herein by reference. The fender protective structures of these systems are comprised of a very hard outer plastic layer of ultra high molecular weight polyethylene (UHMWPE), a highly flexible, i.e. rubbery, intermediate elastomeric layer and a very hard base layer comprised of plastic. The base layer is necessary for installation purposes because a system with a conventional elastomeric layer bonded to a plastic layer is too flexible to work with, particularly when the elastomeric layer is partially counter bored.

Elastomer and plastic alloys are known in the marine art for utilization in the journal bearings that support the propeller shafts. More particularly, the alloy is used as stave material in the journal bearing. An example of such alloys is described in commonly owned U.S. Pat. No. 4,735,982 to Orndorff, Jr. Orndorff, Jr. teaches mixing a thermoset rubber compound and a thermoplastic, with the rubber compound having low friction as well as good oil and water resistant properties. Low friction is defined as material which develops hydrodynamic lubrication at normal shaft operating speeds. Use of low friction materials is important in bearing applications because shaft wear must be minimized. For this reason, higher friction rubber compounds are inappropriate in the alloy described in Orndorff, Jr.

Efforts to improve such fender protective systems have led to continuing developments to improve their versatility, practicality and efficiency.

DISCLOSURE OF THE INVENTION

An object of the present invention is to provide a method of making two layer bonded fender protective structures.

Another object is to provide a less expensive method to manufacture a bonded fender protective structure.

A general object is to provide an efficient and effective method of manufacturing a fender protective structure which is relatively hard, has a resilient layer with a delayed elastic response and is able to bulge upon impact for improved energy absorption.

According to the preferred embodiment of the present invention, a method of making a fender protective structure comprising the steps of providing a mold, disposing cured elastomeric spacers in the mold, pouring an alloy mix of crumb elastomer and plastic powder into the mold over said elastomeric spacers, pouring a plastic layer over the alloy mix, curing both the plastic layer (to make a very hard top layer) and the elastomer and plastic alloy mix (to thereby make a relatively hard elastomer and plastic alloy, the alloy being resilient and having a delayed elastic response) and, removing the elastomeric spacers. Removal of the elastomeric spacers creates voids in the alloy to reduce weight and to allow for expansion of the alloy upon impact. The fender protective structure thus includes an improved energy absorbing elastomer plastic alloy layer.

The present invention provides a superior method that makes fender protective structures practical, while maintaining optimum resiliency for energy absorption and return and optimum rigidity for ease of installation.

The present invention further provides a method for making a two layer fender protective structure having a relatively hard, resilient with a delayed elastic response, structure which has room to expand on impact, and which slowly returns to its original shape for receiving subsequent impacts. The structure is instantaneously low in resilience, meaning it has high energy absorbing characteristics, and has a delayed elastic response or resilience, meaning it is able to regain its original dimensions in time delay after impact upon removal of an applied impact force, the delay being between 1 second to over an hour depending on circumstances.

These and other objects, features and advantages of the present invention will become more apparent in the light of the detailed description of exemplary embodiments thereof, as illustrated by the drawings.

DESCRIPTION OF THE PREFERRED EMBODIMENT

Figure 1:
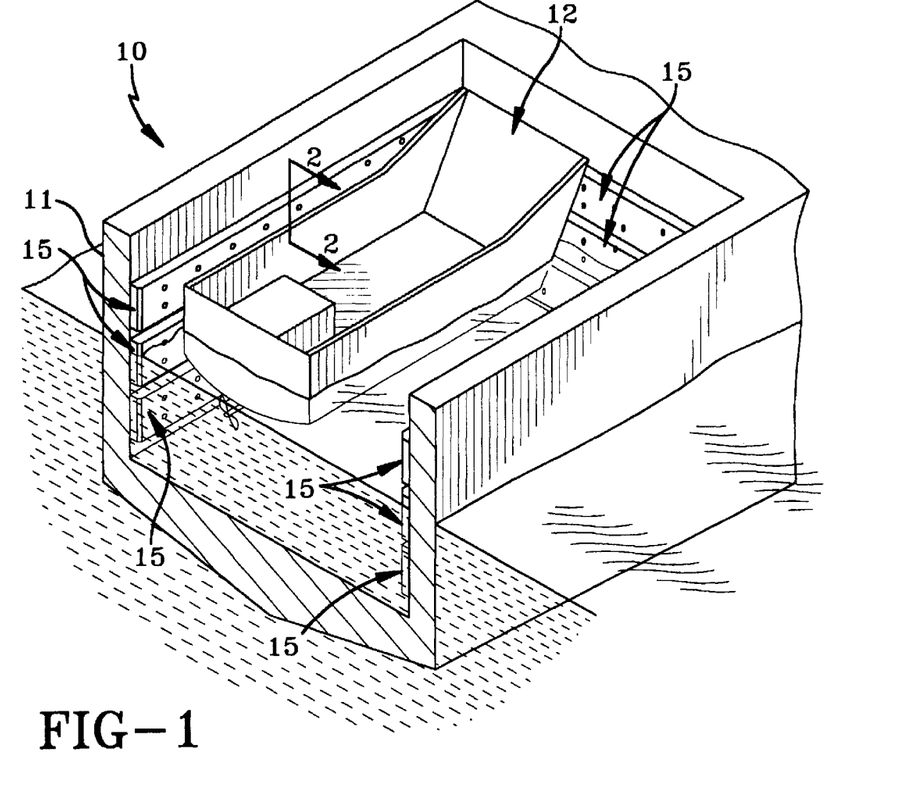
FIG. 1 is a perspective view illustrating the present invention wherein a larger vessel only partly shown, has fenders disposed along the water level under the vessel, with a second vessel being received in the hull of such first vessel.

Referring now to the drawings, wherein like reference numerals designate like or corresponding parts throughout the several views, there is shown in FIG. 1 a portion of a ship or larger vessel 10 whose hull is designated by the numeral 11. Such vessel 10 is a docking vessel with an open hull capable of lowering a door, not shown, to allow water into the hull to receive smaller vessels 12 such as landing craft, whereby the larger vessels may transport such smaller vessels for ferrying operations close to land.

Located above and below the water line as depicted in FIG. 1, there are a plurality of impact pads or fender protective structures 15 extending in a horizontal direction and suitably attached to the hull of the larger vessel 10. Each fender 15 is a composite member which includes a longitudinally extending, inwardly disposed (as viewed in the larger vessel 10) first layer of plastic material 16 and a resilient layer 17 with a delayed elastic response attached thereto. The top layer 16 of the present invention may not be necessary in certain applications of the present fender protector of the present invention.

Figure 2:
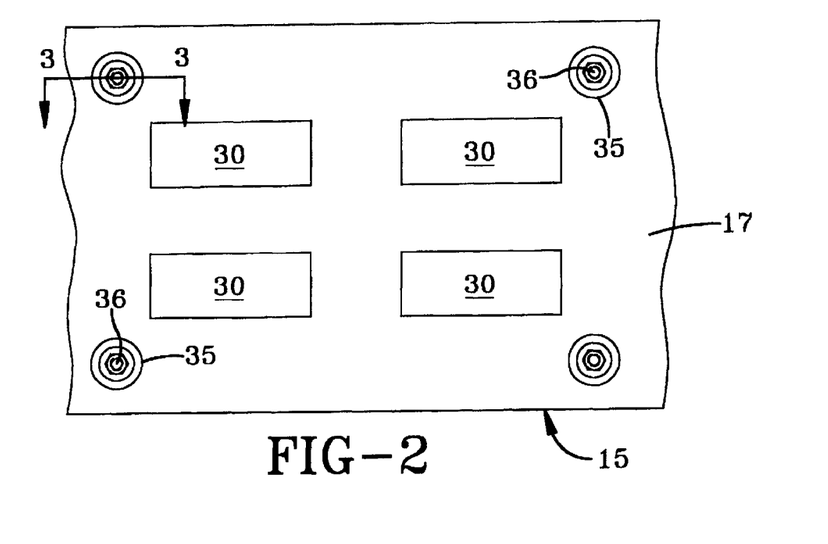
FIG. 2 is a side elevational view of the back side of a fender protective structure in accordance with the present invention, taken on line 2—2 of FIG. 1.

Referring now to FIG. 2, the resilient, elastic layer 17 has a plurality of rectangular bore holes 30 provided therethrough, for providing space to allow the material of layer 17 to bulge upon impact force being applied thereto. It should be understood that resilient, elastic layer 17 is relatively inflexible; it is not rubbery and is fairly hard. It rapidly bulges upon impact, but slowly returns to its original configuration. Layer 17 also has a plurality of circular mounting bore holes 35 provided therein for the mounting of the pads. Nut and bolt connection assemblies 36 hold the pads in place. It is significant that layer 17 is hard enough to hold assemblies 36 sufficiently so that they can properly hold the fender protective structure in place in the hull. It is to be noted that holes 30, 35 may also be any of a number of other shapes not specifically shown herein. Holes 30 are preferably molded into layer 17. Mounting bore holes 35 are very important for isolating the fasteners (nut and bolt connectors) from impact forces. Bolt stress reduction is well over 75% due to providing the radial bulge area (elastomer compounds are not compressible like gases, at pressures less than 10,000 psi). Impact stresses on fender protective structures or impact pads are well under 5,000 psi. If there is no bulge area, the fender protective structure is virtually incompressible and might as well be made of steel. The radial bulge area allows the fastener bolts or studs to be adequately tightened or prestressed, and prevents damage to the fasteners upon impact to the fender protective structure.

Figure 3:
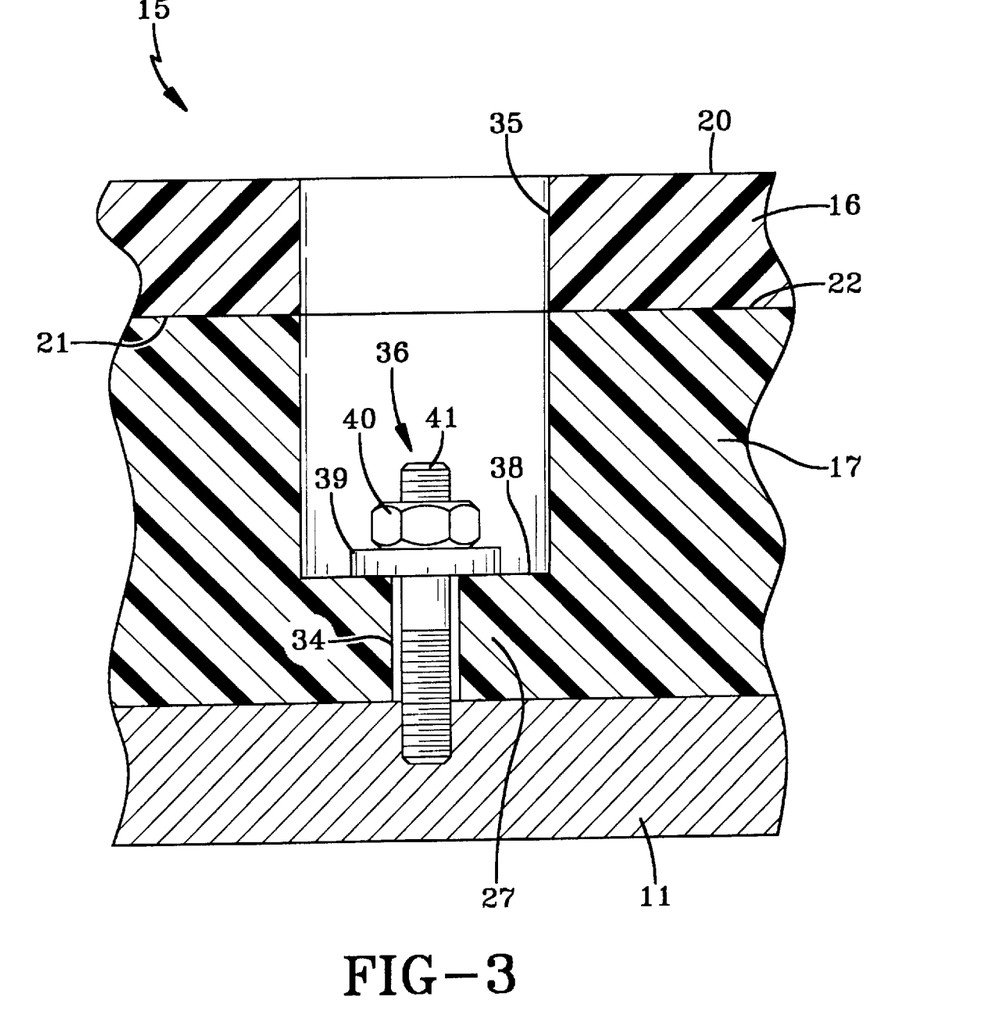
FIG. 3 is a plan view of a fender protective structure taken in cross section on line 3—3 of FIG. 2.

Referring now to FIG. 3, the first layer or outermost layer 16 as viewed from inside the larger vessel 10 has an outer surface 20 and an inner surface 21. First layer 16 is a very hard plastic, preferably a thermoplastic, and most preferably ultra high molecular weight polyethylene (UHMWPE) which has a melt flow index less than 0.15 measured in accordance with the test procedure of ASTM 1238-65T modified by an additional 3 kilogram load. UHMWPE is understood to be a polyolefin having an ultra high molecular weight which measured by the solution viscosity method is greater than 2.5 million. Polyolefin is understood to be a polymer or copolymer of one or more mono-olefins having no more than four carbon atoms, as well as mixtures of these polymers and/or copolymers, between themselves. It may also be a thermoplastic-rubber polymer alloy or blend comprised of UHMWPE and a low friction thermoset rubber compound. Such alloys are described in commonly owned U.S. Pat. No. 4,735,982, the disclosure of which is hereby fully incorporated herein by reference. It is to be noted that the alloy described in U.S. Pat. No. 4,735,982 can only be utilized for the top layer of the present invention. Alternatively, layer 16 may be comprised of a compression molded flame retardant high impact strength UHMWPE composition as described in commonly owned U.S. Pat. No. 5,286,576, the disclosure of which is also hereby fully incorporated herein by reference. In the finished molded or densified form, this composition is comprised of 86 volume percent UHMWPE, a minimum of 4.40 volume percent of a flame retardant compound (10 pph based on UHMWPE for ammonium polyphosphate on a weight bases) in a minimum of 6 volume percent of chopped reinforcing fiber (19.0 pph based on UHMWPE for chopped fiberglass on a weight bases). In addition, the bulk volume of the chopped reinforcing fibers used in the above composition has measured by a tapped density test described herein must be at least about 27 volume percent of the finished compression molded volume of flame retardant high impact composition. The maximum volume loadings of the flame retardant compound and chopped reinforcing fibers are only limited by the minimum requirement of 7 ft-lb/inch width of notched izod impact strength, as long as both components are present above the minimum leadings described above.

The resilient, elastic layer 17 is relatively hard compared to layer 16, and not highly flexible or rubbery. Layer 17 has an outer surface 22 that is in abutting contact with and bonded to the inner surface 21 of the first layer 16. To attach the fender structure 15 to the hull 11 of a vessel, the respective first and second layers have a plurality of mounting bores 35, extending in alignment with a narrower bore 34 extending into the hull 11. Bore 35 extends to approximately the middle to two thirds the thickness of the resilient, elastic layer, thereby defining a shoulder or bottom 38 to receive the flat base of a washer 39 and the head of a nut 40 secured to the threaded head of a bolt 41 that is suitably fastened to the hull 11. Such bores 35 are molded into the resilient, elastic layer 17 and the top layer 16 and extend about one half to two thirds of the way through such resilient layer leaving a space 27 that facilitates the attachment of the fender to the bulkhead or hull 11. Bore 34 is drilled through area 27 of layer 17 for receiving bolt 41. The open area of the bores of the resilient, elastic layer to the total layer thereof is on the order of 30% to 60%, thus permitting sufficient bulging of the elastic layer so that damage to the connection assemblies 36 is avoided. In addition, the open area of the bores lightens the resilient, elastic layer.

A preferred thickness for use of the composite laminate structure as a fender protective device, the UHMWPE layer 16 is approximately 3.175 centimeters to 1.27 centimeters thick.

Although the preferred form of the present invention shows the first layer of UHMWPE as solid, it could be perforated or have bores; however, there is risk that sharp projection on the impacting vessel could catch in the bores and rip the pad if the force exceeded the strength of either the first or second layers, or the bond between.

Heretofore, it was desirable to include a third layer between the elastomeric layer and the hull in order to provide rigid integrity to the composite laminate fender structure predominantly because prior elastomeric layers were too flexible. The present invention provides an improvement to prior fender structures as will be described in further detail hereinafter. By virtue of the improvement, the elastomeric layer is eliminated and replaced by a relatively hard, resilient layer with a delayed elastic response, and the third layer between the elastomeric layer and the hull is eliminated.

The preferred material for the resilient, elastic layer 17 of the present invention consists of an elastomer and plastic blend or alloy, preferably crumb natural rubber held together by a matrix of the thermoplastic UHMWPE. An elastomer is defined as a substance that can be stretched at room temperature to at least twice its original length and, after having been stretched and the stress removed, returns with force to approximately its original length in a short time. (See Glossary of Terms as prepared by ASTM Committee D-11 on Rubber and Rubber-like Materials, published by the American Society of Testing Materials). The elastomeric or rubber material that can be used in constructing the present invention includes any of the well known elastomers, such as natural rubber, SBR rubber, copolymers of butadiene and acrylonitrile, copolymers of butadiene and styrene, copolymers of butadiene and alkyl acrylates, butyl rubber, olefin rubbers such as ethylene-propylene and EPDM rubber, fluorocarbon rubbers, fluorosilicone rubbers, silicone rubber, chlorosulfonated polyethylene, polyacrylates, polybutadiene, polychloroprene and the like. As noted before, however, natural rubber and other elastomers that have high elasticity are most preferred. Such elastomers have a shore A hardness of less than 65 before grinding. Of particular interest in the present invention is crumb rubber obtained by grinding used automotive or truck tires, because they are predominantly natural rubber and ground tire material is inexpensive. Fabric and steel wire particles originally in the tires should be removed.

The new alloy is hard, preferably having a hardness of 48 shore D, and fasteners can effectively be tightened against it. It is not "rubbery." As explained earlier, the alloy has a delayed elastic response, and if it is impacted by a large object such as a ship it will absorb the energy imparted by the force and deform; however, it will over an extended period of time (from seconds to over an hour) recover its initial shape and dimensions.

Figure 4A:
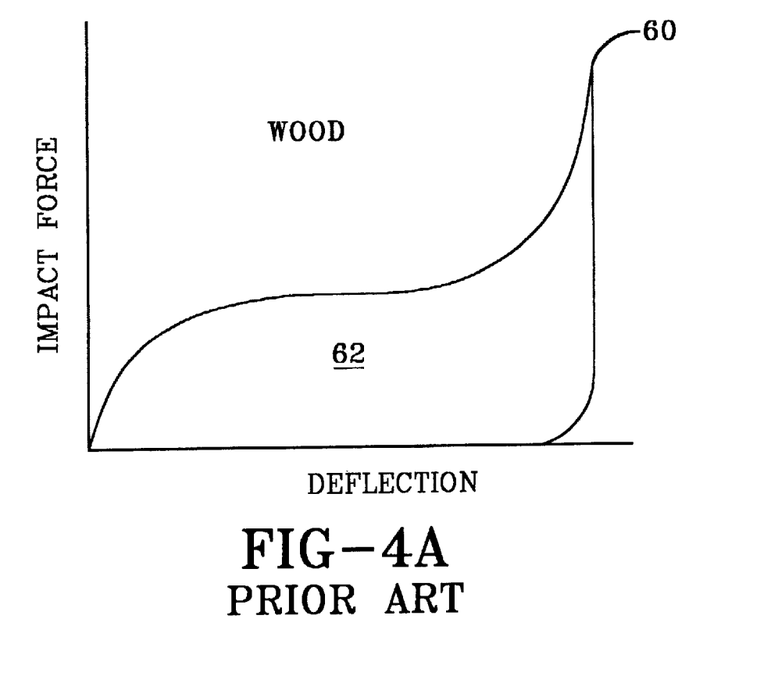
FIG. 4a is a is a graph illustrating the impact force versus deflection force of wood, showing a point of crushing or permanent deformation.

Referring now to FIG. 4a, wherein an impact force versus deflection curve for wood is illustrated. It can be seen that force is applied up to a maximum point 60. When force is relaxed, the material is permanently set and does not recover. This curve illustrates that wood has high damping, low resiliency and very low recovery. The amount of energy absorption of the material is represented by the area 62 under the curve. It can be seen that wood has high energy absorption but is good for only one severe impact, after which it loses its favorable characteristics.

Figure 4B:
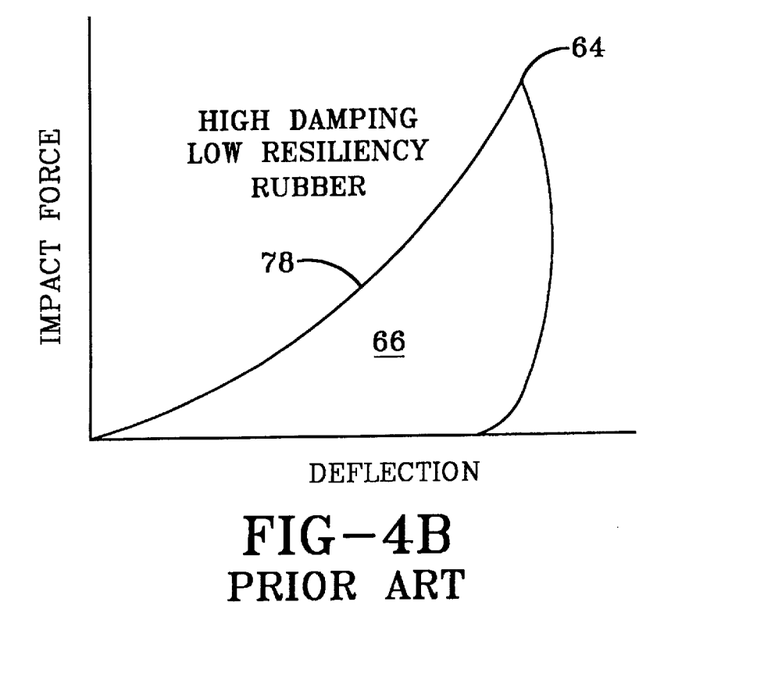
FIG. 4b is a graph illustrating the impact force versus deflection force of high damping, low resiliency rubber.

Referring now to FIG. 4b, wherein an impact force versus deflection curve for a high damping, low resiliency rubber is illustrated. It can be seen that force is applied up to a maximum point 64. When force is relaxed, the material is permanently set and does not recover. This curve is similar to the one for wood, meaning that the material has high damping, low resiliency, low recovery, and that it has high energy absorption (area 66) but is good for only one severe impact, after which it loses its favorable characteristics.

Figure 4C:
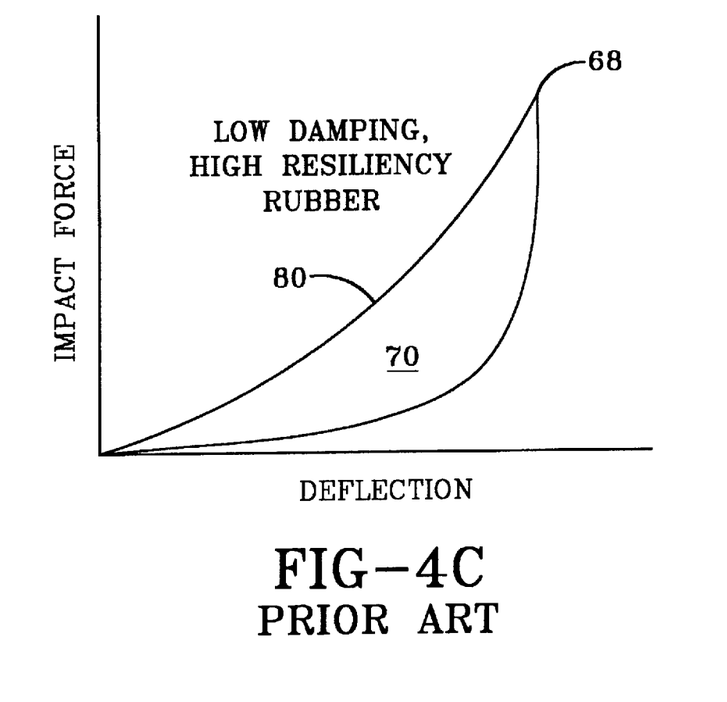
FIG. 4c is a graph illustrating the impact force versus deflection force of low damping, high resiliency rubber.

Referring now to FIG. 4c, wherein an impact force versus deflection curve for a low damping, high resiliency rubber is illustrated. It can be seen that force is applied up to a maximum point 64. When force is relaxed, the material returns reasonably close to its original shape, meaning the material has low permanent set. This material is therefore good for multiple severe impacts. Energy absorption (represented by hysteresis area 70) is, however, quite low, meaning that the material has high rebound and produces a slingshot effect, which is highly undesirable.

Figure 4D:
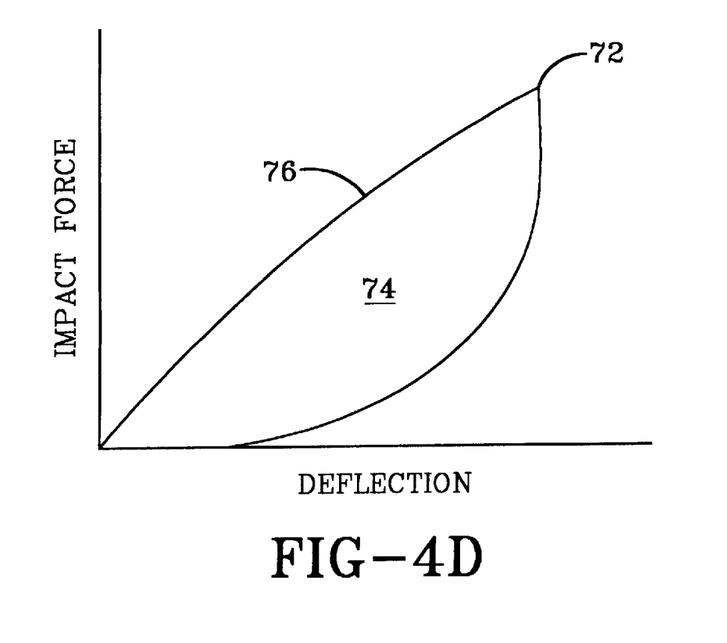
FIG. 4d is a graph illustrating the impact force versus deflection force of the elastomer and plastic alloy of the present invention.

Referring now to FIG. 4d, wherein an impact force versus deflection curve for the elastomer and plastic alloy of the present invention is illustrated. It can be seen that force is applied up to a maximum point 72. When force is relaxed, the material returns close to its original shape, meaning the material has low permanent set. In addition, energy absorption is high, since hysteresis area 74 is large. It can be seen that a factor contributing to the high energy absorption is that the top curve 76 for the present invention is convex, whereas the top curves 78, 80 for the materials for FIGS. 4b and 4c, respectively, are concave. It is to be noted that the hysteresis area 74 is about twice as large as that of FIG. 4c.

FIG. 4d therefore illustrates that the elastomer plastic alloy of the present invention provides the favorable characteristics for a fender protective structure without the drawbacks of prior materials. That is, the present elastomer plastic alloy has high damping, high resiliency, low permanent set, high energy absorption and a delayed elastic response. The material is good for multiple severe impacts and does not give a sling shot effect due to the delayed response.

As mentioned in the Background of the Invention section, commonly owned U.S. Pat. No. 4,735,982 to Orndorff, Jr. teaches mixing a thermoset rubber compound and a thermoplastic for use as staves in journal bearings. Low friction is critical property in the Orndorff, Jr. application. The friction properties of the alloy of the present invention are not necessarily as important as high elasticity, low hardness and high energy absorption. However, highly elastic, soft elastomers with high energy absorption inherently have high friction properties. The low friction elastomers of U.S. Pat. No. 4,735,982 inherently have low elasticity, high hardness and low energy absorption. The teachings of Orndorff, Jr. are therefore not compatible with the requirements of the present invention.

Manufacture of the fender protective structure of the present invention is as follows. For the elastomer used in the present alloy, a rubber compound is cured and, (in order to mix the two components), is ground to a suitable size to make a crumb rubber. Conventional grinding methods can be utilized, such as mechanical or cryogenic grinding. The crumb rubber is thoroughly dry mixed with a UHMWPE powder until a generally uniform random dispersion of the rubber is achieved. The particle size of the rubber and UHMWPE preferably pass through a Tyler mesh screen below 35, with the 20 mesh particles being more preferable. Because of the free flowing nature of the UHMWPE, the rubber and UHMWPE powder mix very easily. The preferred ratio of constituents is on the order of 30% UHMWPE powder and 70% crumb rubber by weight. Thus a elastomer plastic mixture 94 is created.

Figure 5:
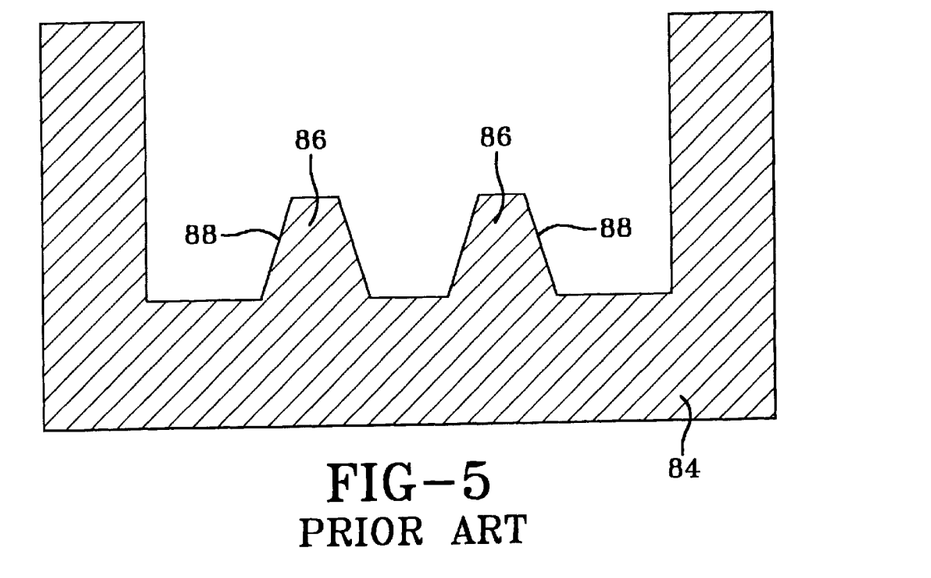
FIG. 5 is a schematic cross section taken through a prior art fender panel mold.

Referring now to FIG. 5, heretofore molds 84 were provided for curing fender protective structures. Projections 86 were provided integrally therewith for displacing the rubber compound for creating expansion bores in the cured resilient layer. The projections 86 had to be treated with a mold release material and had to have tapered sides 88 in order to facilitate separation of the mold from the material after the curing cycle. The necessary tapers and large number of projections 86 unduly increased tooling costs for producing fender protective structures. Even with the tapered projections and mold release preparation, though, it is still difficult to separate the mold and finished product, resulting in increased manufacturing costs due to time and labor.

Figure 6:
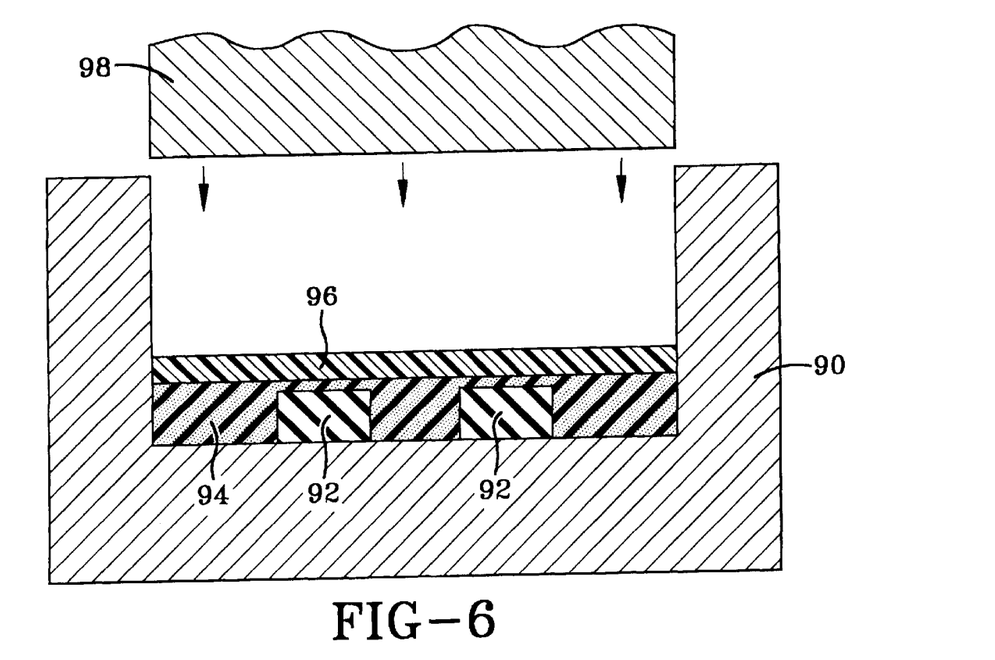
FIG. 6 is a schematic cross section taken through a mold in which the components of a fender panel embodying the concept of the present invention have been assembled prior to processing.
Figure 7:
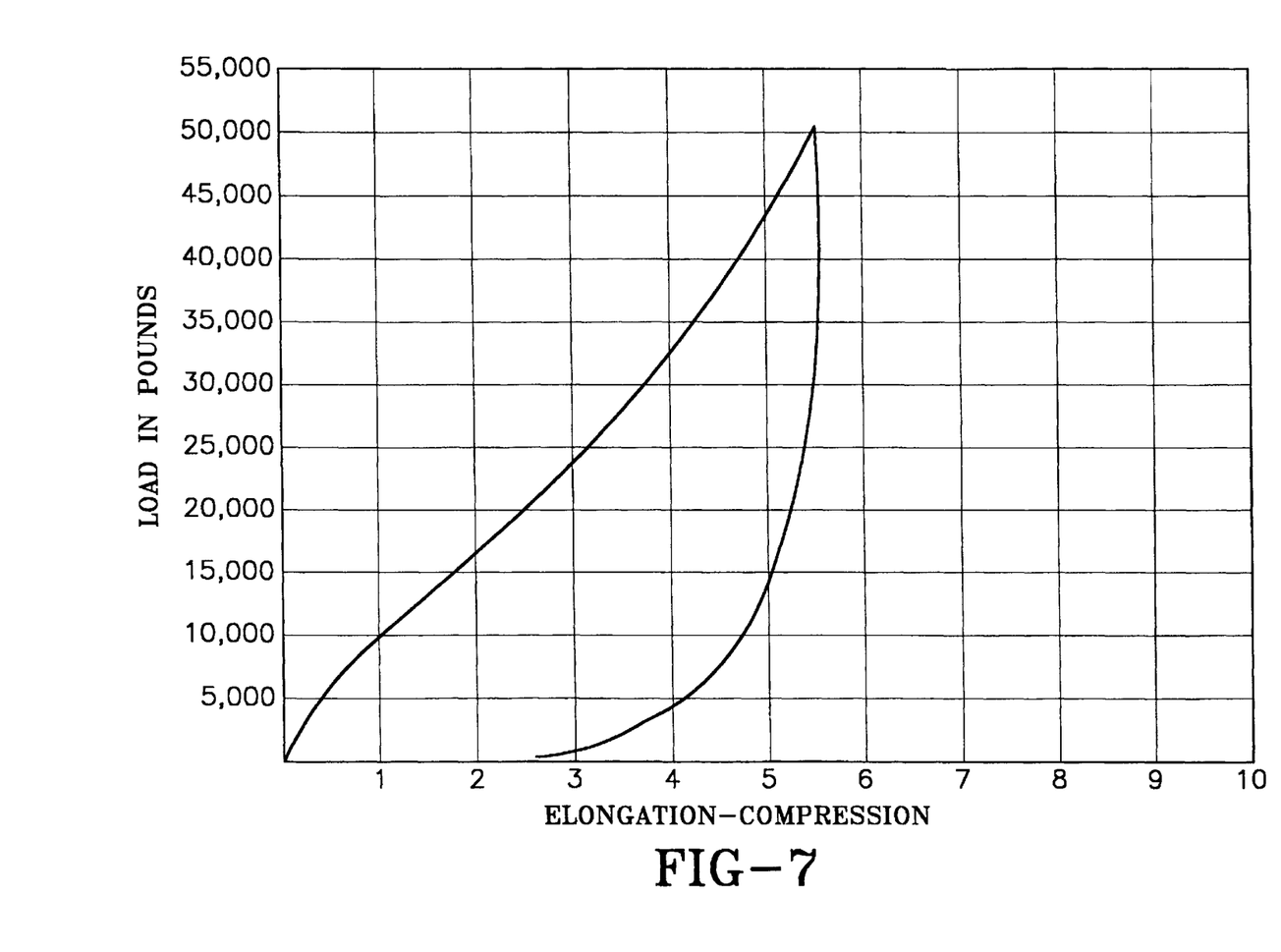
FIG. 7 is a graph of an impact test conducted on the alloy of the invention at one impact load.
Figure 8:
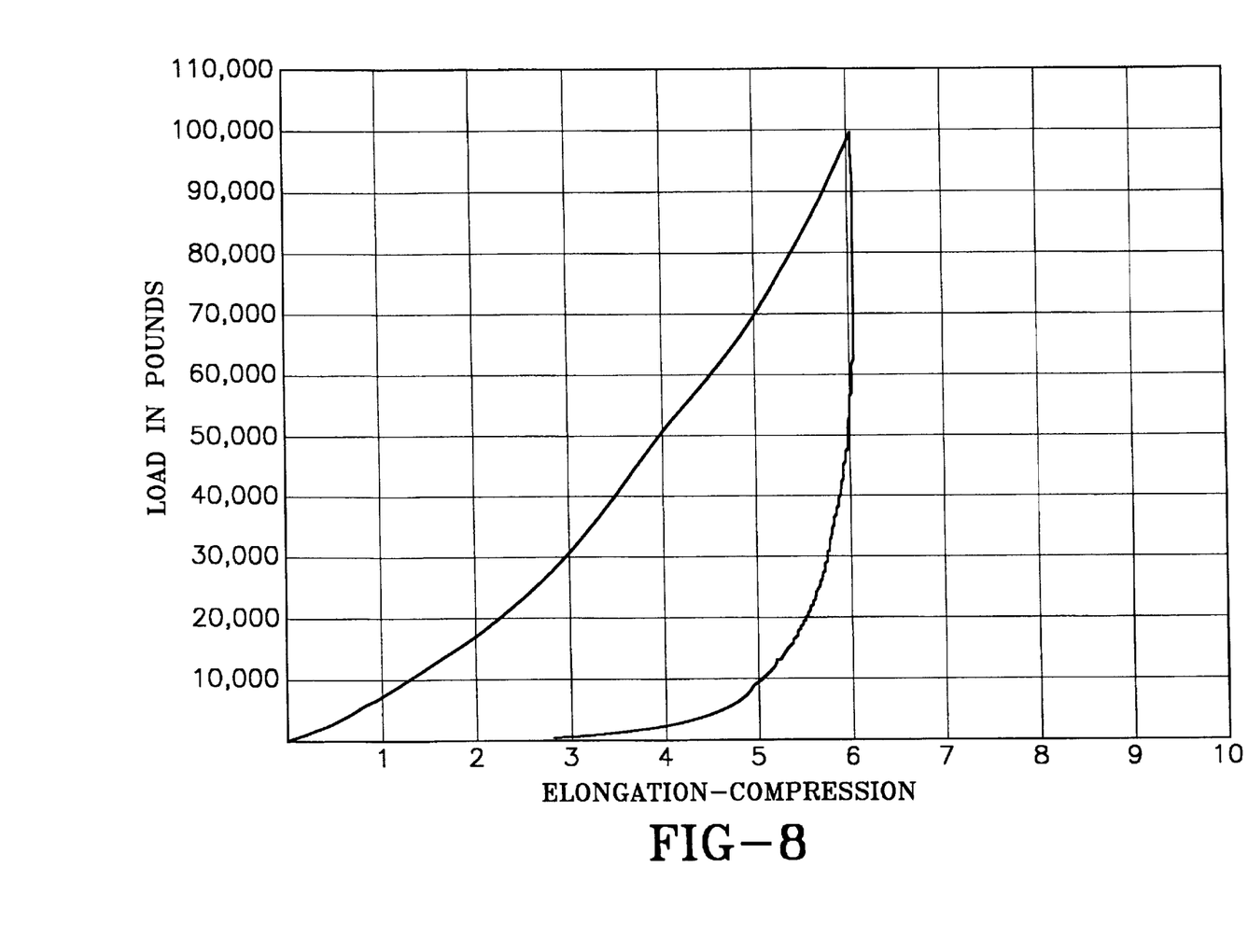
FIG. 8 is a graph of an impact test conducted on the alloy of the invention at a second impact load.
Figure 9:
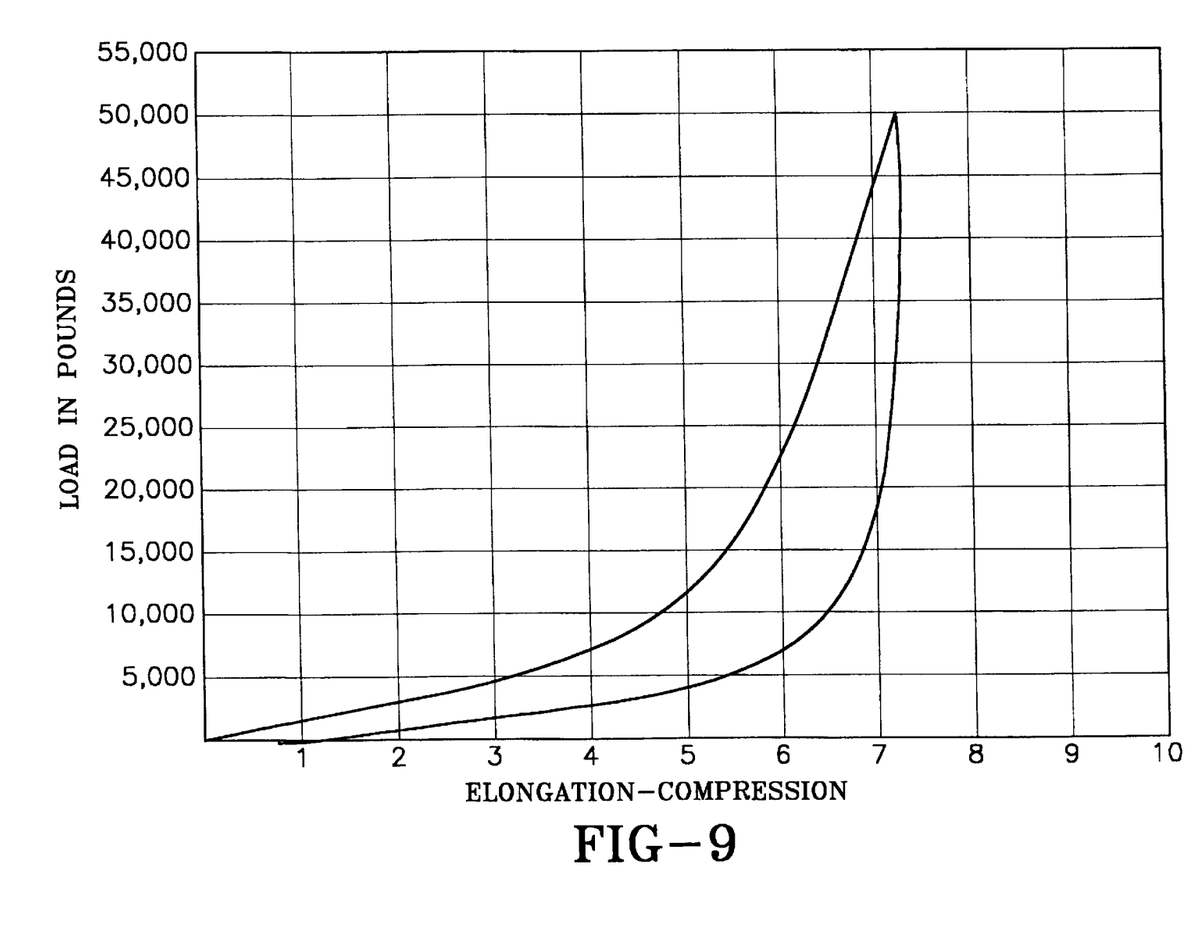
FIG. 9 is a graph of an impact test conducted on rubber at one impact load.
Figure 10:
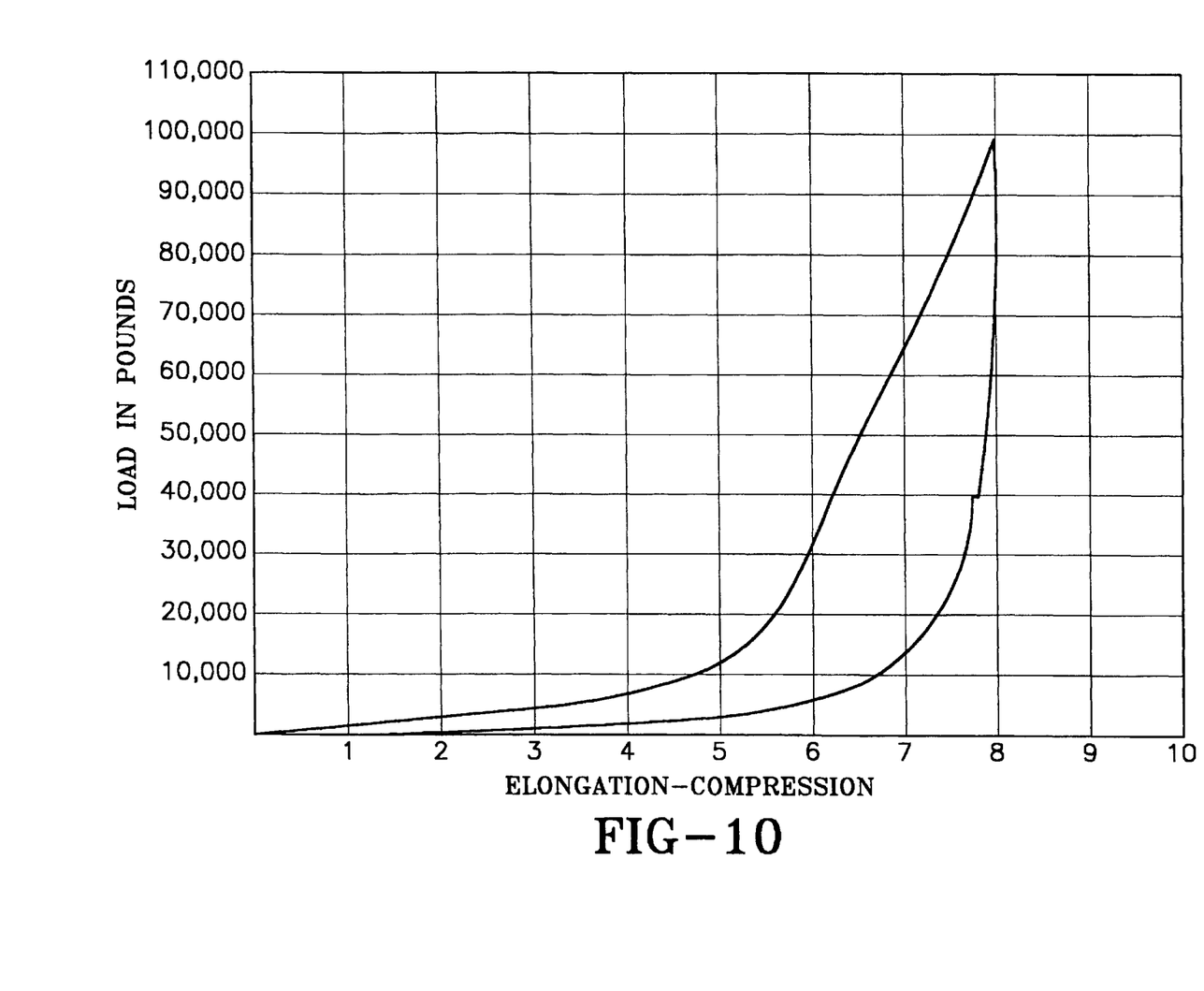
FIG. 10 is a graph of an impact test conducted on rubber at a second impact load.

Referring now to FIG. 6, a mold 90, having the desired shape of the fender panels is provided. In accordance with another aspect of the present invention, a plurality of cured rubber blocks, plugs or projections 92 (having the desired shape of the bores 30 in FIG. 2) are placed in the mold at the desired locations for the bores 30. Other cured rubber projections are provided for bores 35. The rubber and UHMWPE mix 94 is then poured into the mold body over the rubber blocks 92 and the blocks for bores 35. The rubber and UHMWPE mix 94 is then covered with a layer 96 of UHMWPE powder. A mold cover 98 is then secured onto the mold body and sufficient pressure and heat are applied thereto to mold the elastomer and rubber together and melt the polyethylene powder. The heating temperature must be above the glass transition temperature (Tg) of the plastic. Desirable heating temperatures range from about 290° F. to about 360° F. and preferably between 310° and 350° F. After the melted polyethylene powder has: a) coalesced to form a top polyethylene layer 16; and b) sufficiently bonded the crumb rubber particles together, the mixture is cooled under pressure (at least 600 psi and desirably more than 1000 psi) to ambient temperature in order to prevent cracking or strain failure of the alloy. The mold is then opened, and the finished composite is removed. This procedure makes for a very even and high quality molded article because the flow distortions problematic of conventional thermoplastic compounds are eliminated.

It is to be noted that the rubber projections 92 are preferably made of the same elastomeric material as defined above for use in the elastomer plastic alloy, such as a nitrile rubber. The rubber projections 92 are easy to manufacture and inexpensive to make, regardless of the required shape. Rubber projections or spacers 92 shrink more than the rubber plastic alloy during cooling, and therefore are easy to remove. That is the coefficient of thermal expansion of the rubber projections is greater than the very low coefficient of thermal expansion for the rubber plastic alloy and the rubber projections are more elastic than the alloy (after molding). These characteristics facilitate easy removal of the projections from the alloy after the fender protective structure is cooled. To this end, it has been found that the rubber projections "pop" out of the cured alloy when urged slightly. Sometimes the projections 92 simply fall out. It is now apparent that use of the removable rubber projections 92 reduces manufacturing costs of the fender protective structure of the present invention. It should be noted that spacers in prior versions of fender protectors were made from steel, which did not shrink at all during cooling—and whose removal was extremely difficult.

A way to improve the notoriously poor thermal conductivity (heat transfer) of the cured rubber void forming projections 92 involves increasing the slightly greater coefficient of thermal expansion of the rubber projections 92 so that they will shrink dimensionally even more than the UHMWPE/rubber polymer alloy. This should assure an easy release of the rubber projections 92 at the cooled-down temperature. One could not advantageously add powdered aluminum to the uncured rubber compound, similar to what is often done in tires for high speed (Mach 2) aircraft bombers, because this would decrease the coefficient of thermal expansion, causing the rubber projections 92 to be tightly locked in place instead of easily releasing. The inventor has determined that aluminum metal cylinders can be inserted into circular holes spaced periodically across the plan (top) view of the projections 92 and the projections for bores 35. Aluminum has roughly 1000 times the thermal conductivity of rubber. Replacing only ten percent of the rubber plan view area with the aluminum cylinders would significantly increase the heat flow through the blocks as shown in the Table discussed below, without noticeably reducing the coefficient of thermal expansion.

Since the metal cylinders are not adhered to the rubber (inserted after cure), the cylinders will not affect the elastic deflection. Copper cylinders (2,000 times the thermal conductivity of rubber) or heat pipes (over 100,000 times the thermal conductivity of rubber) would work even better, but at a significant increase in cost.

Accordingly, high thermal conductivity materials 99 are combined with projections 92 to increase their coefficient of thermal or heat conductivity. Materials 99 can be cylindrical aluminum containers as shown in FIG. 6. Materials 99 increase the heat flow to the alloy being cured. Upon cooling, the bore-producing projections shrink more than the plastic/elastomer alloy due to their higher coefficient of thermal expansion, to make the separation of the projections expedient. The following Table and calculations show how to determine the number of plugs required if made from aluminum or copper.

TABLE I

| Material | Thermal Conductivity, k (BTU-ft/Hour-ft$^2$-° F.) |
|---|---|
| Nitrile Rubber | 0.098 |
| Aluminum | 117 |
| Copper | 224 |
| Steel | 26 |
| Heat Pipes | 100,000+ |

Heat conducted through 1 ft$^2$ of area=k (1 ft$^2$)

A. Nitrile Rubber=0.098 (1)=0.098 BTU-ft/Hour-° F.
   Replacing 10% of area with aluminum plugs:
   Conducted Heat
   =0.098 (0.9)+117 (0.1)
   =0.088+11.7
   =11.788 BTU-ft/Hour-° F.
   Conducted Heat Ratio=aluminum plugs/nitrile rubber= 11.788/0.098=120.3

B. Replacing 10% of area with copper plugs:
   Conducted Heat
   =0.098 (0.9)+224 (0.1)
   =0.088+22.4
   =22.488 BTU-ft/hour-° F.
   This is not quite as good as for steel.
   Heat conducted through 1 ft$^2$ of area Steel=26 (1)=26 BTU-ft/hour-° F.

C. Replacing 20% of area with copper plugs:
   Conducted Heat
   =0.098 (0.8)+224 (0.2)
   =0.0784+44.8
   =44.88 BTU-ft/hour-° F.
   Conducted Heat Ratio=copper plugs/steel=44.88/26=1.73 (an improvement)

D. No. of 1" diameter copper plugs required for 20% coverage:
   =0.2 (144)/Π(1)$^2$/4=0.2 (144) (4)/Π=36.67
   =37 Plugs It should also be noted that the present alloy shows no loss of adhesion to the top plastic layer or other plates. No adhesives or other special materials or procedures are needed to cause the top layer to bond to the resilient layer.

The preferred characteristics of the elastomer/plastic alloy of the present invention are a shore A hardness of 95, an elastic or Young's modulus in compression of on the order of 5,469 psi for a shape factor=0.381, and a specific gravity of 1.09 (30% UHMWPE). It has been discovered that the present elastomer and plastic alloy as a unique combination of high damping, low resiliency and high recovery not found in conventional materials utilized before.

Immediate resiliency is defined herein as the percentage of impacting energy that is returned to the impacting object on the immediate rebound (ASTM-D-2632). In the case of a fender protective structure, a low resilience percentage is desired in order to eliminate the possibility of sling shot or whiplash occurring to the occupants of impacting vessels. To this end, the present alloy has similar deflection values and similar resiliency percentages (23–25%) of prior elastomeric compounds used in fender protective structures. An advantage of the present alloy though, because of its delayed elastic response, is that it return within several minutes to very near its original thickness whereas former high damping elastomeric compounds exhibited considerable permanent set, because conventional elastomeric compounds having high damping (low resilience) invariably have high permanent set.

The present alloy permits a lower cost fender protective structure which because a third layer is unnecessary and the present alloy is less than half the cost of prior elastomeric compounds.

Energy absorption of the present invention is also maximized because of the greater thickness of the elastomer alloy layer compared with former three layer designs. The result is that the bolts/studs are better isolated from impact forces while reducing the complexity of the system. The bonded two layer design of the present invention also has a much larger circumferential area (for the rubber to bulge upward) between the washer OD and the hole ID then is the case with conventional three layer designs. This helps to better isolate the bolts from impact forces.

EXAMPLE

Tests were conducted to determine the relative energy absorption valves between an EPDM rubber (S-401) developed by The B.F. Goodrich Company for bonded 3-layer impact pads (or batterboard) use with the 2-layer batterboard incorporating crumb rubber (such as made from ground up truck tire rubber). The S-401 rubber cannot be bolted against a rigid support because it is a relatively soft elastomer, and could not be used in the bonded 2-layer design.

In the graphs of test plats shown in FIGS. 7–10, the area shown between the load and unload (or rebound) curves shows the absorbed energy. The experiments were conducted to show and compare the absorbed energy.

It has been determined that high speed drop test impacts on batterboard could be simulated with equivalent damage by subjecting the test samples to very high compressive loads at much slower speeds using a large, conventional physical property test machine. 50,000 pounds has been found to be a high load, and 100,000 pounds has been found to be an extremely high load. (The impact energy is the same on both the drop test and the compressive test.)

TABLE II

| | UHMWPE/CRUMB RUBBER ALLOY | | EPDM RUBBER (S-401) | |
|---|---|---|---|---|
| | 50,000 LBS | 100,000 LBS. | 50,000 LBS | 100,000 LBS |
| Overall Dimensions (Plan View and Thickness) | 4 × 4 × 3.3125 in. | 4 × 4 × 3.3125 in. | 4 × 4 × 3.563 in. | 4 × 4 × 3.563 in. |
| Elastomer Thickness | 2.625 in. | 2.625 in. | 2.325 in | 2.325 in. |
| Elastomer Hardness | 75 | 75 | 65 | 65 |
| Overall Dimensions (Plan View) (After Test) | 4.625 in. × 4.625 in. | 5.25 in. × 5.25 in. | 4.125 × 4.125 in. | 4.313 × 4.5 in |
| Overall Thickness Minutes After Testing | 2.875 in. | 2.5 in. | 3.313 in. | 3.063 in. |
| Recovery After 5 Minutes | 85.3% | 75.5% | 91.0% | 86.0% |
| Recovery After 1.5 Hours and 2.0 Hours | | (1.5 Hours) 85.3% | | (2 Hours) 91.0% |
| Comments | No cracks or splits | Started cracking at 70,000 lbs. | | |
| Amount of Energy Absorbed | 25,769 in. - lbs. | 47,692 in. - lbs. | 13,461 in. - lbs. | 30,769 in. - lbs. |

(The same sample in each case was consecutively tested at 50,000 and 100,000 lbs.)

The results of the tests are significant. The bonded 2-layer with the alloy absorbed 91.4% more energy than the S-401 rubber (25,769 vs. 13,461 in.-lbs.) when exposed to the 50,000 lb. force, and absorbed 55.5% more energy than the S-401 rubber (47,692 vs. 30,769 in.-lbs.) when exposed to the 100,000 lb. force. The S-401 rubber compressed more and returned much more energy on the rebound (sling-shot effect). The destructive reaction pressure on the back-up metal supporting structure would also be significantly reduced with the bonded 2-layer because of its greater energy absorption.

The results of the tests are shown for multiple or repeated impact capability. The test shown in FIG. 4C shows immediate elastic recovery for the S-401 rubber, whereas the new alloy's tests shown in FIG. 4D shows a delayed elastic response or resiliency.

The test results shown on the foregoing Table and FIGS. 7–10 indicate that the new alloy was recovering its thickness at a faster rate than the S-401 rubber (see both "Recovery" rows in Table II).

Although the invention has been shown and described with exemplary embodiments thereof, it should be understood by those skilled in the art that the foregoing and various other changes, omissions and additions may be made therein and thereto without departing from the spirit and scope of the invention.

What is claimed is:

1. A method of making a fender protective structure to be contacted by external objects, comprising a relatively hard, resilient layer having a delayed elastic response and voids therein that extend to approximately the middle to two-thirds the thickness of the layer, said method comprising the following steps:
   providing a mold;
   disposing cured elastomeric spacers in the mold;
   pouring a mix of elastomer and plastic powder in said mold over the elastomeric spacers, said elastomer and plastic powder being selected to yield a hard product having the delayed elastic response to impact after the plastic powder has melted and solidified with the elastomer;
   pressurizing and heating the mix of elastomer and plastic powder to melt the mix to make an elastomer and plastic alloy;

cooling the mix to solidify the alloy; and removing the elastomeric spacers to create the fender protective structure comprising the relatively hard, resilient layer having the delayed elastic response with the voids in the layer to enable the bulging of the alloy upon impact force being applied to the fender protective structure.

2. A method according to claim 1 wherein the elastomeric spacers are cured.

3. A method according to claim 1 wherein the elastomer poured with the mix comprises crumb elastomer.

4. A method according to claim 3 wherein the elastomer and plastic alloy is a blend of crumb rubber held together by a matrix of thermoplastic ultra high molecular weight polyethylene.

5. A method according to claim 1 wherein the elastomeric spacers are cured rubber projections, the elastomer and plastic powder mix are rubber and ultra high molecular weight polyethylene, and the step of pressurizing and heating comprises covering the mold and applying sufficient pressure and heat to mold the rubber and ultra high molecular weight polyethylene together.

6. A method according to claim 5 wherein the step of cooling the mix comprises cooling the mix to ambient temperature under sufficient pressure to prevent cracking and strain failure of the alloy, and further comprising the step of opening the mold and removing the spacers.

7. A method according to claim 1 wherein the spacers have a higher coefficient of thermal expansion than the layer, and the heated spacers shrink more than the layer upon cooling, facilitating the step of removing the spacers from the layer.

8. The method according to claim 7 and further including adding material having a higher coefficient of thermal conductivity than the layer to the spacers, to increase the flow of heat to the layer being molded.

9. The method according to claim 8 wherein the material is aluminum.

10. The method according to claim 8 wherein the material added to the spacers to increase their coefficient of thermal conductivity comprises adding rods of the material to the spacers.

11. A method according to claim 1 wherein the inner layer is characterized by low creep and permanent set compared to rubber.

12. A method according to claim 1 wherein the plastic powder in the mix is ultra high molecular weight polyethylene powder, and the elastomer in the mix is crumb rubber, and wherein the step of pressurizing and heating produces an alloy of 30 percent ultra high molecular weight polyethylene and 70 percent rubber, by weight.

13. A method according to claim 1 wherein the alloy produced by the step of pouring a mix of elastomer and plastic powder and pressurizing and heating the mix, comprises pouring a mix that yields an alloy produced by the pressurizing and heating, which alloy has more elastomer than plastic by weight.

14. A method according to claim 1 wherein the elastomeric spacers are selected from the group consisting of copolymers of butadiene and styrene, fluorosilicone rubbers and silicone rubber.

15. A method according to claim 1 wherein the inner layer is relatively hard, having a hardness of at least 48 Shore D.

16. A method of making a fender protective structure for attachment to a support to be contacted by external objects, comprising a relatively hard, resilient inner layer for being located proximal the support, having a delayed elastic response, voids in the inner layer that extend to approximately the middle to two-thirds the thickness of the inner layer, and an outer layer harder than the inner layer located on the layer and distal from the support when the structure is attached to the support, said method comprising the following steps:

providing a mold;

disposing cured elastomeric spacers in the mold;

pouring a mix of elastomer and plastic powder in said mold over the elastomeric spacers, said elastomer and plastic powder being selected to yield a hard product having the delayed elastic response to impact after the plastic powder has melted and solidified with the elastomer;

pouring plastic powder in said mold to cover the mix;

pressurizing and heating the mix of elastomer and plastic powder, and the plastic powder, to make an elastomer and plastic alloy, and a plastic layer on the alloy; and removing the elastomeric spacers to create the fender protective structure having the relatively hard, resilient inner layer having the delayed elastic response with the voids in the inner layer to enable the bulging of the alloy upon impact force being applied to the fender protective structure, and the harder outer layer.

17. A method according to claim 16 wherein the mix of elastomer and plastic powder is a blend of crumb rubber held together by a matrix of thermoplastic ultra high molecular weight polyethylene, and the plastic powder is ultra high molecular weight polyethylene.

18. A method according to claim 16 wherein the plastic powder in the mix is ultra high molecular weight polyethylene and the step of pressurizing and heating comprises covering the mold and applying sufficient pressure and heat to exceed the glass transition temperature of the polyethylene, and to cause the polyethylene to melt and cause the melted polyethylene to coalesce to form a top polyethylene layer.

19. A method according to claim 18 and further comprising the steps of cooling the mix and the polyethylene under pressure to ambient temperature, and of opening the mold and removing the spacers.

20. A method according to claim 16 wherein the spacers have a higher coefficient of thermal expansion than the inner layer, and the heated spacers shrink more than the inner layer upon cooling, facilitating the step of removing the spacers from the inner layer.

21. The method according to claim 20 and further including adding material having a higher coefficient of thermal conductivity than the inner layer to the spacers, to increase the flow of heat to the layers being molded.

22. The method according to claim 21 wherein the step of adding material comprises inserting metal cylinders into circular holes spaced periodically across the plan view of the spacers.

23. A method according to claim 16 wherein the inner layer has low creep and permanent set relative to rubber.

24. A method according to claim 16 wherein the plastic powder in the mix is ultra high molecular weight polyethylene powder, and the elastomer in the mix is crumb rubber, and wherein the step of pressurizing and heating produces an alloy of 30 percent ultra high molecular weight polyethylene and 70 percent rubber, by weight, and the plastic powder for covering the mix is ultra high molecular weight polyethylene powder.

25. A method according to claim 16 and further comprising the step of selecting elastomeric spacers for creating voids in the inner layer which serve as fastener holes for holding fasteners for securing the fender protective structure to the support being protected.

* * * * *